US009619304B2

(12) United States Patent
Webster et al.

(10) Patent No.: US 9,619,304 B2
(45) Date of Patent: Apr. 11, 2017

(54) AUTOMATIC CONNECTIONS BETWEEN APPLICATION COMPONENTS

(75) Inventors: Roger R. Webster, San Martin, CA (US); David Tristram, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1112 days.

(21) Appl. No.: 12/026,410

(22) Filed: Feb. 5, 2008

(65) Prior Publication Data

US 2009/0199213 A1    Aug. 6, 2009

(51) Int. Cl.
G06F 9/54    (2006.01)
G06F 9/44    (2006.01)

(52) U.S. Cl.
CPC . *G06F 9/54* (2013.01); *G06F 8/34* (2013.01)

(58) Field of Classification Search
None
See application file for complete search history.

(56) References Cited

U.S. PATENT DOCUMENTS

| 4,752,893 A | 6/1988 | Guttag et al. |
| 5,168,441 A | 12/1992 | Onarheim et al. |
| 5,289,574 A | 2/1994 | Sawyer |
| 5,297,250 A | 3/1994 | Leroy et al. |
| 5,357,603 A | 10/1994 | Parker |
| 5,388,201 A | 2/1995 | Hourvitz et al. |
| 5,481,665 A | 1/1996 | Okada et al. |
| 5,490,246 A | 2/1996 | Brotsky et al. |
| 5,522,022 A | 5/1996 | Rao et al. |
| 5,537,630 A | 7/1996 | Berry et al. |
| 5,564,022 A | 10/1996 | Brown |
| 5,588,098 A | 12/1996 | Chen et al. |

(Continued)

FOREIGN PATENT DOCUMENTS

| CN | 1684034 | 10/2005 |
| EP | 548586 | 6/1993 |

(Continued)

OTHER PUBLICATIONS

Daniel et al., "Mashing Up Context-Aware Web Applications: A Component-Based Development Approach," WEB Information Systems Engineering—Wise 2008; Lecture Notes in Computer Science, vol. 5175, 2008, pp. 250-263, XP019103131.

(Continued)

*Primary Examiner* — Syed Roni
(74) *Attorney, Agent, or Firm* — Shook, Hardy & Bacon L.L.P.

(57) ABSTRACT

One or more aspects of the subject matter described in this disclosure include identifying a first application component received by a running application, identifying a first automatically connectable connection for the first application component, selecting a second automatically connectable connection for a second application component, the second application component residing in the running application, and automatically connecting the first connection with the second connection so that information can be exchanged between the first application component and the second application component by way of the first connection and the second connection while the first application is running.

30 Claims, 10 Drawing Sheets

(56) References Cited

U.S. PATENT DOCUMENTS

| | | |
|---|---|---|
| 5,602,997 A | 2/1997 | Carpenter et al. |
| 5,638,501 A | 6/1997 | Gough et al. |
| 5,651,107 A | 7/1997 | Frank et al. |
| 5,731,819 A | 3/1998 | Gagne et al. |
| 5,742,285 A | 4/1998 | Ueda |
| 5,764,229 A | 6/1998 | Bennett |
| 5,764,238 A | 6/1998 | Lum et al. |
| 5,765,156 A | 6/1998 | Guzak et al. |
| 5,793,376 A | 8/1998 | Tanaka et al. |
| 5,796,402 A | 8/1998 | Ellison-Taylor |
| 5,801,700 A | 9/1998 | Ferguson |
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,877,741 A | 3/1999 | Chee et al. |
| 5,877,762 A | 3/1999 | Young |
| 5,883,639 A | 3/1999 | Walton et al. |
| 5,913,063 A * | 6/1999 | McGurrin et al. ............ 717/109 |
| 5,920,659 A | 7/1999 | Iverson et al. |
| 5,933,148 A | 8/1999 | Oka et al. |
| 5,949,409 A | 9/1999 | Tanaka et al. |
| 5,978,579 A | 11/1999 | Buxton et al. |
| 6,005,568 A | 12/1999 | Simonoff et al. |
| 6,006,231 A | 12/1999 | Popa |
| 6,011,562 A | 1/2000 | Gagne et al. |
| 6,031,937 A | 2/2000 | Graffagnino |
| 6,045,446 A | 4/2000 | Ohshima |
| 6,075,543 A | 6/2000 | Akeley |
| 6,128,010 A | 10/2000 | Baxter et al. |
| 6,144,381 A | 11/2000 | Lection et al. |
| 6,154,601 A | 11/2000 | Yaegashi et al. |
| 6,166,748 A | 12/2000 | Van Hook et al. |
| 6,191,797 B1 | 2/2001 | Politis |
| 6,191,807 B1 | 2/2001 | Hamada et al. |
| 6,195,664 B1 | 2/2001 | Tolfa |
| 6,211,890 B1 | 4/2001 | Ohba |
| 6,246,418 B1 | 6/2001 | Oka |
| 6,266,053 B1 | 7/2001 | French et al. |
| 6,266,430 B1 | 7/2001 | Rhoads |
| 6,272,484 B1 | 8/2001 | Martin et al. |
| 6,272,558 B1 | 8/2001 | Hui et al. |
| 6,278,448 B1 | 8/2001 | Brown et al. |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,321,314 B1 | 11/2001 | Van Dyke |
| 6,353,437 B1 | 3/2002 | Gagne |
| 6,356,903 B1 | 3/2002 | Baxter et al. |
| 6,369,823 B2 | 4/2002 | Ohba |
| 6,369,830 B1 | 4/2002 | Brunner et al. |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh et al. |
| 6,427,230 B1 | 7/2002 | Goiffon et al. |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,469,714 B2 | 10/2002 | Buxton et al. |
| 6,483,524 B1 | 11/2002 | Petchenkine et al. |
| 6,489,963 B2 | 12/2002 | Parikh et al. |
| 6,512,522 B1 | 1/2003 | Miller et al. |
| 6,525,736 B1 | 2/2003 | Erikawa et al. |
| 6,526,174 B1 | 2/2003 | Graffagnino |
| 6,542,160 B1 | 4/2003 | Abgrall |
| 6,542,166 B1 | 4/2003 | Washington et al. |
| 6,542,750 B2 | 4/2003 | Hendrey et al. |
| 6,571,328 B2 | 5/2003 | Liao et al. |
| 6,573,896 B1 | 6/2003 | Ribadeau Dumas et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,636,214 B1 | 10/2003 | Leather et al. |
| 6,639,595 B1 | 10/2003 | Drebin et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,687,745 B1 | 2/2004 | Franco et al. |
| 6,697,074 B2 | 2/2004 | Parikh et al. |
| 6,707,462 B1 | 3/2004 | Peercy et al. |
| 6,714,201 B1 | 3/2004 | Grinstein et al. |
| 6,715,053 B1 | 3/2004 | Grigor |
| 6,717,599 B1 | 4/2004 | Olano |
| 6,734,864 B2 | 5/2004 | Abgrall |
| 6,765,592 B1 | 7/2004 | Pletcher et al. |
| 6,788,318 B2 | 9/2004 | Chen |
| 6,806,892 B1 | 10/2004 | Plow et al. |
| 6,906,720 B2 | 6/2005 | Emberling et al. |
| 6,910,000 B1 | 6/2005 | Yedidia et al. |
| 6,911,984 B2 | 6/2005 | Sabella et al. |
| 6,931,633 B1 | 8/2005 | Vazquez et al. |
| 6,944,829 B2 | 9/2005 | Dando |
| 6,985,939 B2 | 1/2006 | Fletcher et al. |
| 6,993,721 B2 | 1/2006 | Rosin et al. |
| 7,016,011 B2 | 3/2006 | De Haan |
| 7,027,055 B2 | 4/2006 | Anderson et al. |
| 7,047,276 B2 | 5/2006 | Liu et al. |
| 7,050,955 B1 | 5/2006 | Carmel et al. |
| 7,219,328 B2 | 5/2007 | Schloegel et al. |
| 7,337,409 B2 | 2/2008 | Doblmayr et al. |
| 7,367,028 B2 | 4/2008 | Kodosky et al. |
| 7,415,664 B2 | 8/2008 | Aureglia et al. |
| 7,496,888 B2 | 2/2009 | Sanjar et al. |
| 7,533,349 B2 | 5/2009 | Saul et al. |
| 7,644,391 B2 | 1/2010 | Fisher et al. |
| 2001/0030647 A1 | 10/2001 | Sowizral et al. |
| 2001/0035885 A1 | 11/2001 | Iron et al. |
| 2002/0046395 A1* | 4/2002 | Briggs ................ G06F 9/44526 717/116 |
| 2002/0065946 A1 | 5/2002 | Narayan |
| 2002/0067418 A1 | 6/2002 | I |
| 2002/0078453 A1 | 6/2002 | Kuo |
| 2002/0083415 A1 | 6/2002 | Jazdzewski |
| 2002/0087660 A1 | 7/2002 | Martin et al. |
| 2002/0089526 A1 | 7/2002 | Buxton et al. |
| 2002/0093516 A1 | 7/2002 | Brunner et al. |
| 2002/0112180 A1 | 8/2002 | Land et al. |
| 2002/0118217 A1 | 8/2002 | Fujiki |
| 2002/0120673 A1 | 8/2002 | Tolson et al. |
| 2002/0129092 A1 | 9/2002 | Tolson et al. |
| 2002/0140740 A1 | 10/2002 | Chen |
| 2002/0171682 A1 | 11/2002 | Frank et al. |
| 2002/0174181 A1 | 11/2002 | Wei |
| 2002/0186257 A1 | 12/2002 | Cadiz et al. |
| 2003/0005412 A1 | 1/2003 | Eanes |
| 2003/0008711 A1 | 1/2003 | Corbo |
| 2003/0018708 A1 | 1/2003 | Hlasny |
| 2003/0020671 A1 | 1/2003 | Santoro et al. |
| 2003/0046316 A1 | 3/2003 | Gergic et al. |
| 2003/0067489 A1 | 4/2003 | Wong et al. |
| 2003/0080995 A1 | 5/2003 | Tenenbaum et al. |
| 2003/0123739 A1 | 7/2003 | Graffagnino |
| 2003/0132964 A1 | 7/2003 | Santori et al. |
| 2003/0132967 A1 | 7/2003 | Gangadharan |
| 2003/0146934 A1 | 8/2003 | Bailey et al. |
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0184595 A1 | 10/2003 | Kodosky et al. |
| 2003/0189597 A1 | 10/2003 | Anderson et al. |
| 2003/0208595 A1 | 11/2003 | Gouge et al. |
| 2003/0222913 A1 | 12/2003 | Mattila et al. |
| 2004/0012626 A1 | 1/2004 | Brookins |
| 2004/0024884 A1 | 2/2004 | Relimoto et al. |
| 2004/0032409 A1 | 2/2004 | Girard |

(56) References Cited

U.S. PATENT DOCUMENTS

| | | |
|---|---|---|
| 2004/0036711 A1 | 2/2004 | Anderson |
| 2004/0039934 A1 | 2/2004 | Land et al. |
| 2004/0056896 A1 | 3/2004 | Doblmayr et al. |
| 2004/0179019 A1 | 9/2004 | Sabella et al. |
| 2004/0212640 A1 | 10/2004 | Mann et al. |
| 2004/0215740 A1 | 10/2004 | Frank et al. |
| 2004/0223003 A1 | 11/2004 | Heirich et al. |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0060655 A1 | 3/2005 | Gray et al. |
| 2005/0060661 A1 | 3/2005 | Kawahara et al. |
| 2005/0088447 A1 | 4/2005 | Hanggie et al. |
| 2005/0088452 A1 | 4/2005 | Hanggie et al. |
| 2005/0144563 A1 | 6/2005 | Hough et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0193368 A1 | 9/2005 | Becker et al. |
| 2005/0215310 A1 | 9/2005 | Boyd et al. |
| 2005/0229190 A1* | 10/2005 | Peters et al. .................. 719/331 |
| 2005/0240857 A1 | 10/2005 | Benedict et al. |
| 2005/0256940 A1 | 11/2005 | Henderson et al. |
| 2005/0278651 A1 | 12/2005 | Coe et al. |
| 2005/0282612 A1 | 12/2005 | Mathews |
| 2005/0283734 A1 | 12/2005 | Santoro et al. |
| 2006/0059431 A1 | 3/2006 | Pahud |
| 2006/0064674 A1 | 3/2006 | Olson et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0123356 A1 | 6/2006 | Sobeski et al. |
| 2006/0218499 A1 | 9/2006 | Matthews |
| 2006/0294498 A1* | 12/2006 | Partamian ..................... 717/106 |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0074126 A1 | 3/2007 | Fisher et al. |
| 2007/0074157 A1 | 3/2007 | Worden et al. |
| 2007/0101291 A1* | 5/2007 | Forstall et al. ............... 715/805 |
| 2007/0143252 A1* | 6/2007 | Toorn ............................... 707/2 |
| 2007/0157101 A1 | 7/2007 | Indiran et al. |
| 2007/0162589 A1 | 7/2007 | Riddle |
| 2007/0203984 A2 | 8/2007 | AlHusseini et al. |
| 2007/0209013 A1 | 9/2007 | Ramsey et al. |
| 2007/0234195 A1 | 10/2007 | Wells |
| 2008/0109828 A1* | 5/2008 | Cho et al. ..................... 719/320 |
| 2008/0155518 A1 | 6/2008 | Van Wyk et al. |
| 2008/0201453 A1 | 8/2008 | Assenmacher |
| 2008/0248834 A1 | 10/2008 | Chatterjee et al. |
| 2009/0082011 A1* | 3/2009 | Zhang et al. .............. 455/426.1 |

FOREIGN PATENT DOCUMENTS

| | | |
|---|---|---|
| EP | 0694879 | 1/1996 |
| EP | 1383080 | 1/2004 |
| EP | 0972273 | 3/2004 |
| WO | WO98/45815 | 10/1998 |
| WO | WO02/09039 | 1/2002 |
| WO | WO2004/027707 | 4/2004 |

OTHER PUBLICATIONS

Grolaux et al., "Attach Me, Detach Me, Assemble Me Like You Work," Human-Computer Interaction—Interact 2005, Lecture Notes in Computer Science; LNCS Springer, Berlin DE 3585:198-212, XP019018979 (Jan. 1, 2005).

International Search Report for Application Serial No. PCT/US2008/074059, dated Jan. 23, 2009, 11 pages.

Streitz et al., "i-Land: An Interactive Landscape for Creativity and Innovation," CHI 1999 Conference Proceedings Human Factors in Computing System. Pittsburg, PA (May 15-20, 1999), pp. 120-127, XP000894211.

Carciofi, Authorized Officer, "International Search Report and Written Opinion", Patent Cooperation Treaty, PCT/US2009/033114, dated May 7, 2009, 12 pages.

Lambert, International Search Report and Written Opinion dated Mar. 24, 2009 for International Application No. PCT/US2008/078496, filed Jan. 10, 2008 (30 pages).

O'Conner John, "Creating Extensible Applications with the Java Platform," Sun Java Technical Articles [Online] Sep. 2007, retrieved from the Internet: URL:http://java.sun.com/developer/technicalArticles/javase/extensible/ [retrieved on Apr. 27, 2009], 10 pages.

Adobe Systems Incorporated, "A Manager's Introduction to Adobe eXtensible Metadata Platform, The Adobe XML Metadata Framework" White Paper, 2001, downloaded from the internet at http://www.adobe.com/products/xmp/pdfs/whitepaper.pdf, 18 pages.

Adobe Systems Incorporated, "Adobe GoLive, Version 6.0, Overview" downloaded from the internet at http://www.adobe.com/golive, 2002, 4 pages.

Adobe Systems Incorporated, "Embedding XMP Metadata in Application Files (Draft),"Sep. 14, 2001, downloaded from the internet at http://xml.coverpages.org/XMP-Embedding.pdf, 16 pages.

Adobe Systems Incorporated, "Extensible Metadata Platform (XMP)," downloaded from the internet at http://www.adobe.com/products/xmp/main.html on Apr. 12, 2003, 2 pages.

Adobe Systems Incorporated, "XMP—Extensible Metadata Platform, Version 1.5," Sep. 14, 2001, downloaded from the internet at http://xml.coverpages.org/XMP-MetadataFramework.pdf, 88 pages.

Akeley, et al. "Real-Time Graphics Architecture," downloaded from the internet at http://www.graphics.stanford.edu/courses/cs448a-01-fall, 2001, 20 pages.

Altman, R.B., "Visual Quickstart Guide Power Point 2000/98"Peachpit Press, May 7, 1999, Retrieved from the Internet at http://www.proquest.safaribooksonline.com/0201354411, 7 pages.

Apple Computer, Inc. "Writing a Desk Accessory," Developer Connection, downloaded from the internet at URL: http://developer.apple.com/documentation/mac/devices/devices-16.html on Jan. 3, 2006, 3 pages.

Beged-Dov, et al. "RDF Site Summary (RSS) 1.0", downloaded from the internet at http://web.resources.org/rss/1.0/spec on Apr. 15, 2003, 23 pages.

Cadiz, et al., "Sideshow: Providing Peripheral Awareness of Important Information," Technical Report MSR-TR-2001-83, Sep. 14, 2001, downloaded from the internet at ftp://ftp.research.microsoft.com/pub/tr/tr-2001-83.pdf, 9 pages.

Casteller, "International Search Report", European Patent Office, PCT/US2005/008805, Aug. 8, 2005, 3 pages.

Conner, et al. "Three-Dimensional Widgets" ACM Proceedings of the 1992 symposium on Interactive 3D graphics, Special Issue of Computer Graphics, vol. 26, 1992, pp. 183-188, 230-231 *8 pages.

DelChiaro, "International Search Report", European Patent Office, PCT/US2005/008804, Jul. 27, 2005, 3 pages.

Desktop Sidebar, "Desktop Sidebar Home Page", downloaded from the internet at http://webarchive.org/web/20040101160831/http://www.desktopsidebar.com/, on May 11, 2007, 5 pages.

Elliott, "Programming Graphics Processors Functionally," Proceedings of the 2004 Haskell Workshop, Sep. 22, 2004. 11 pages.

Farrand, et al. "Common Elements in Today's Graphical User Interfaces: The Good, the Bad, and the Ugly," Proceedings of the Interchi '93, Human Factors in Computing Systems, 1993, pp. 470-473.

Fried, "Developer Calls Apple's Tiger a Copycat," CNET News.com, Jun. 28, 2004, downloaded from the internet at http://zdnet.com.com/2102-1104 2-5250692.html?tag=printthis on Jul. 1, 2004, 2 pages.

(56) References Cited

OTHER PUBLICATIONS

Fried, "For Apple's Tiger, the Keyword is Search", CNET News.com, Jun. 28, 2004, downloaded from the internet at http://zdnet.com.com/2102-1103 2-5250346.html?tag=printthis on Jul. 1, 2004, 2 pages.
Friedman, et al. "Dashboard Blog Dec. 4, 2003", downloaded from the internet at http://www.nat.org/dashboard/blog.php3, on May 11, 2007, 31 pages.
Gellersen, et al. "WebComposition: An Object-Oriented Support System for the Web Engineering Lifecycle", Computer Networks and ISDN Systems, vol. 29, Issue 8-13 (Sep. 1997), 11 pages.
Gruber, "Dashboard vs. Konfabulator", Jun. 2004, downloaded from the internet at http://daringfireball.net/2004/06/dashboard_vs_konfabulator, on May 11, 2007, 9 pages.
Haeberli, et al., "The Accumulation Buffer: Hardware Support for High-Quality Rendering," Computer Graphics, vol. 24, No. 4, Aug. 1990, pp. 309-318.
IDEAlliance, et al. "PRISM: Publishing Requirements for Industry Standard Metadata, Version 1.2(e), First Public Draft," Sep. 4, 2002, downloaded from the internet at http://web.archive.org/web/20030406154912/prismstandard.org/spec1.2e.pdf, 95 pages.
IDEAlliance, Inc., "Information and Content Exchange, An XML Based Distribution Protocol," 2002, downloaded from the internet at http://www.icestandard.org/servlet/RetrievePage?site=ice&page=aboutice on Feb. 5, 2003, 7 pages.
Interwoven, Inc., "XML in a Content Infrastructure: Conducting Business on the Web, Domain Expertise Series", 2001, Interwoven, Inc., 21 pages.
Konfabulator, "Cupertino, Start your Photocopiers!," Retrieved from the internet at http://www.konfabulator.com, on Jul. 1, 2004, 1 page.
Konfabulator, "Konfabulator & Widget Basics," Retrieved from the Internet at http://www.konfabulator.com/info/basics.html, on Jul. 1, 2004, 3 pages.
Konfabulator, "Screenshots," Retrieved from the Internet at http://www.konfabulator.com/info/screenshots.html on Jul. 1, 2004, 2 pages.
Konfabulator, "What is Konfabulator?," Retrieved from the Internet at http://www.konfabulator.com/info/, on Jul. 1, 2004, 3 pages.
Lammers, et al., "Maya 4.5 Fundamentals: Chapter 13, Particle Systems and Dynamics", New Riders Publishing, 2002, 12 pages.
Microsoft Corporation, "Microsoft SharePoint Portal Server 2001; Architecting Web Parts for Business Applications—(prepared in conjunction with Avanade) White Paper," to be published by the USPTO, 11 pages.
Puder, "Extending Desktop Applications to the Web," ACM International Conference Proceedings Series, Proceedings of the Jun. 2004 International Symposium on Information and Communication Technologies, 2004, vol. 90, pp. 8-13 (6 pages.).
Segal, et al. "The OpenGL Graphics System: A Specification (Version 1.5)," downloaded from the internet at http://www.opengl.org/documentation/specs/version1.5/glspec15.pdf, 2003, 333 pages.
Shantzis, Michael A., "A Model for Efficient and Flexible Image Computing," ACM Proceedings of the 21st annual conference on Computer graphics and interactive techniques, 1994, pp. 147-154.
Shiozawa, Hidekazu et al., "Perspective Layered Visualization of Collaborative Workspaces," Proceedings of the International ACM SIGGROUP conference on Supporting Group Work, 1999, pp. 71-75.
Snippet Software Inc. et al. "Corporate Portal Newsletter: Product Spotlight Non-Browser Based Portal Solution from Snippets Software, Inc.", vol. 1, No. 10, Oct. 2000 downloaded from the internet at http://web.archive.org/web/20010603050951/www.snippets.com/download/Corporate_Portal_Article.pdf, on Jul. 22, 2008, 3 pages.
Snippet Software Inc. et al. "Snippets Software" downloaded from the internet at http://www.snippets.com/, on Jun. 11, 2001, 16 pages.
Staples, "Representation in Virtual Space: Visual Convention in the Graphical User Interface", ACM Proceedings of the INTERACT '93 and CHI '93 Conference on Human Factors in Computing Systems, 1993, pp. 348-354 and 542 (8 pages).
Stardock Corporation "DesktopX Whitepaper and users Guide Version 2" downloaded from the internet at www.stardock.net/media/whitepaper_desktopx.html, on May 14, 2007, 72 pages.
Tang, et al., "ConNexus to Awarenex: Extending Awareness to Mobile Users," ACM Proceedings of the SIGCHI conference on Human factors in computing systems, 2001, pp. 221-228 (8 pages).
Triest, "International Search Report and Written Opinion", European Patent Office, PCT/US2005/022152, Jul. 10, 2006, 8 pages.
Ullenboom, "Java ist auch eine Insel," downloaded from the internet at http://www.galileocomputing.de/openbook/javainsel2//java_140000.htm#Xxx998138, on Apr. 13, 2006, 3 pages.
Van Gelder, et al. "Direct Volume Rendering with Shading via Three-Dimensional Textures," ACM Proceedings of the 1996 symposium on Volume visualization, 1996, 9 pages.
Vieira, "International Search Report and Written Opinion", European Patent Office, PCT/US2005/022579, 15 pages, Jan. 18, 2008.
W3C, "Objects, Images and Applets," Feb. 10, 2003, Retrieved from the Internet at http://www.web.archive.org/web/20030210154019/http://www.w3.org/TR/REC-html140/struct/objects.html, 21 pages.
W3C, "HTML 4.01 Specification, W3C Recommendation Dec. 24, 1999", downloaded from the internet at http://www.w3.org/TR/html14/ on Apr. 16, 2003, 453 pages.
W3C, "Resource Description Framework (RDF) Model and Syntax Specification, W3C Recommendation Feb. 22, 1999", downloaded from the internet at http://www.w3.org/TR/1999/REC-rdf-syntax-19990222/ on Apr. 15, 2003, 56 pages.
W3C, The Information and Content Exchange (ICE) Protocol, w3C Note Oct. 26, 1998:, downloaded from the internet at http://www.w3.org/TR/NOTE-ice.html on Apr. 15, 2003, 129 pages.
W3C "XHTML™ 1.0 The Extensible HyperText Markup Language (Second Edition), A Reformulation of HTML 4 in XML 1.0, W3C Recommendation Jan. 16, 2000, revised Aug. 1, 2002", downloaded from the internet at http://www.w3.org/TR/xhtml1/ on Apr. 16, 2003, 26 pages.
W3C, XSL Transformations (XSLT) Version 1.0, W3C Recommendation Nov. 16, 1999, downloaded from the internet at http://www.w3.org/TR/xslt W3C Recommendation Nov. 16, 1999, 90 pages.
Wardell, "Konfabulator for Windows", downloaded from the internet at URL: http://www.xpthemes.com/forums.asp?MID=19&CMID=19&AID=4472, on Jan. 10, 2004, 6 pages.
Wikipedia "AppleScript", downloaded from the internet at http://en.wikipedia.org/wiki/AppleScript on Dec. 11, 2007, 8 pages.
Wikipedia, "Comparison of Widget Engines", downloaded from the internet at http://wikipedia.org/wiki/Comparison_of_widget_engines, on May 11, 2007, 6 pages.
Wikipedia, "Windows Sidebar", downloaded from the internet at http://en.wikipedia.org/wiki/Windows_Sidebar, on May 11, 2007, 2 pages.
Nvidia, "Teaching Cg,", [online] [Retrieved on Jun. 30, 2011] Retrieved from Internet URL: http://developer.nvidia.com/docs/io/4106/Teaching-Cg.pdf, to be published by the USPTO, 16 pages.
Adobe Systems Incorporated, Adobe GoLive Classroom in a Book: Safari Books Online, Academic, Aug. 16, 2004, downloaded from the Internet http://academic.safaribooksonline.comibookiweb-design-and-developmentI0321278496, 23 pages.
Lowery et al., Macromedia® Dreamweaver® Mx 2004 Web Application Recipes: Safari Books Online, Nov. 24, 2003, published by Macromedia, 2 pp.
Miller, Michael "Google.pedia: The Ultimate Google Resource," Que, pp. 561-565 (Jul. 11, 2006), downloaded from the Internet at http://academic.safaribooksonline.com/book/web-applications-and-services/078973639x, 6 pages.
Miller, Michael, How Microsoft Windows Vista Works, Dec. 28, 2006, published by Microsoft, download from in internet at http://academic.safaribooksonline.com/book/operating-systems/0789735857, 3 pages.
Fejes, Programming Konfabulator Widgets, 10x More Productive Blog (2005).

(56) References Cited

OTHER PUBLICATIONS

U.S. Patent Office, U.S. Appl. No. 12/062,487, filed Apr. 3, 2008, in Office Action dated Sep. 7, 2010, 30 pages.

* cited by examiner

AUTOMATIC CONNECTIONS BETWEEN APPLICATION COMPONENTS

BACKGROUND

Typically, application components such as graphical user interface (GUI) buttons, data grids, and non-visual components such as web services need to be "connected" together or bound by means of script or other programming language in an application. For example, a software programmer can write code such that when a user selects or presses a GUI button, this will cause information from a web service to be presented in a data grid. In order for this to happen, a button selection event needs to cause a request to be sent to the data service and, the subsequent information received from the data service needs to be placed into the data grid. Some development environments simplify the programming aspects of this process somewhat by restricting what types of objects (e.g., data sources) a particular component can be bound to. However, the process of connecting components to one another can still require user input explicitly specifying how components connect.

SUMMARY

In general, one or more aspects of the subject matter described in this specification can be embodied in one or more methods that include receiving information by a running application identifying an application component, the first application component having one or more first automatically connectable connections, the receiving comprising: 1) selecting a first connection for the first application component, the first connection being one of a sink and a source; 2) selecting a second automatically connectable connection for a second application component, the second application component residing in the first running application, the second connection being the other of the sink and the source; and 3) connecting the first connection with the second connection so that information can be exchanged between the first application component and the second application component by way of the first connection and the second connection while the first application is running. Other embodiments of this aspect include corresponding systems, apparatus, and computer program products.

These and other embodiments can optionally include one or more of the following features. The first application component can be obtained from another running application. The first application component can be obtained from a file system. The receiving can comprise integrating code for running the first application component into the first running application. The first application component can have a visual representation in a second running application or a file system. The first application component's visual representation can be presented in the first running application's visual representation and accepting input to determine where the first application component's visual representation is to appear in the first running application's visual representation. Receiving can be triggered by a drag-and-drop operation of the first application component to the second running application. The first automatic connection and the second automatic connection can match. The connection between the first application component and the second application component can be persisted. The information exchanged between the first application component and the second application component can be textual.

Particular embodiments of the subject matter described in this specification can be implemented to realize one or more of the following advantages. Application components can be interactively dragged from a running application or a file system, for example, and dropped onto a new or existing recipient application. When a component is dropped, code executes that attempts to automatically connect all input and output connections on the dropped component to available inputs and outputs on existing components in the recipient application while the recipient application is running. Automatic component connections in the recipient application can be persisted across invocations of the recipient application. Moreover, source code for the dropped component can be automatically integrated into the recipient application for development purposes. If the dropped component has a visual representation, the visual representation can be automatically integrated into the display hierarchy of the recipient application.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
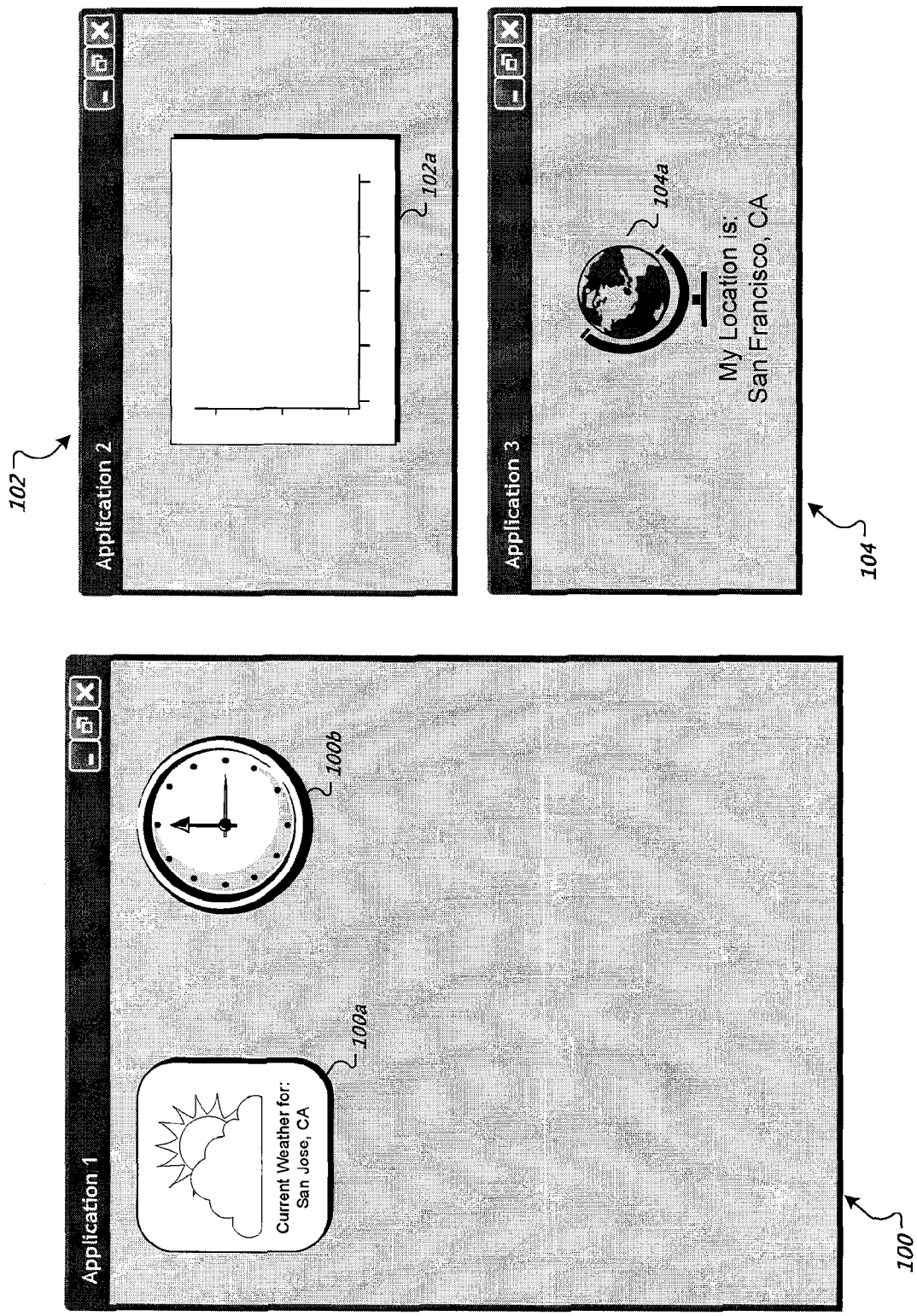
FIGS. 1A-D illustrate example application components in running software applications.

FIG. 1A illustrates example application components in running software applications. (For the sake of brevity, application components and running software applications will be referred to as components and applications, respectively.) Each application in FIG. 1A is represented as a GUI window (100, 102, 104) which is used to implement some or all of a user interface for the respective applications. The application represented by window 100 includes two example components which have visual representations in the window 100: a weather component 100a currently set to report weather for San Jose, Calif., and a clock component 100b which displays the current time. The weather component 100a and the clock component 100b obtain the current weather and time from a web service or information stored locally, for example. The application associated with window 102 includes a graph component 102a for graphing two dimensional data. The application associated with window 104 includes a location component 104a which is operable to obtain the geographic location of the host computer based on the computer's Internet Protocol (IP) address or information stored locally, for instance. In some implementations, a component does not have a visual representation.

The application includes code that implements the functionality of the components or, alternatively, an application does not include code that implements the functionality of components but is capable of providing visual placeholders for them. Generally speaking, a component is a unit of software functionality that is integrated, or can be integrated, into a software application, and represents a subset of an application's functionality. By way of illustration, a component could be realized as one or more functions, methods or procedures in a programming language. Other types of components are possible, as will be described below.

In various implementations, a component is able to be integrated into an application while the application is executing or running. A component can be interactively moved or copied to a so-called recipient application such that the component functionality is integrated into the recipient application while the recipient application is running. Alternatively, the component is integrated into the recipient application after the recipient application has completed execution. The component is identified by a so-called donor application. The component's functionality is integrated into the donor application or, alternatively, the component's functionality is not integrated into the donor application but the component is nonetheless identified by a visual representation or other representation in the donor application. An example of the later case is graphical file system browser which visually depicts files and directories in a computer file system. In this case, the file system GUI serves as a donor application and a component is represented by a file icon in a window showing a directory's contents. If the component does not have a visual representation (e.g., a web service), the donor application can provide a default representation (e.g., a rectangle or other shape) in order to allow a user to interactively manipulate the component.

Figure 1B:
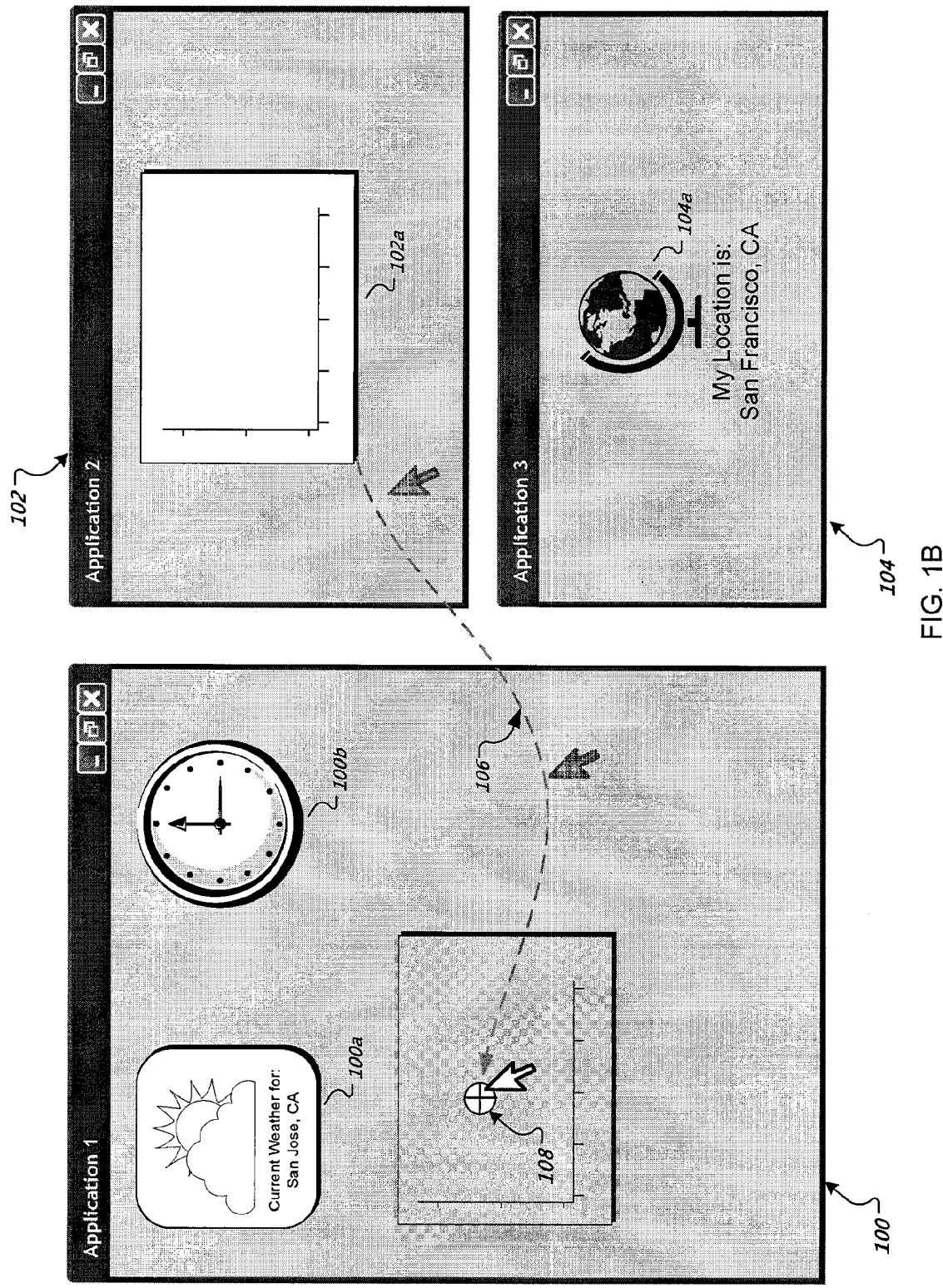
Figure 1C:
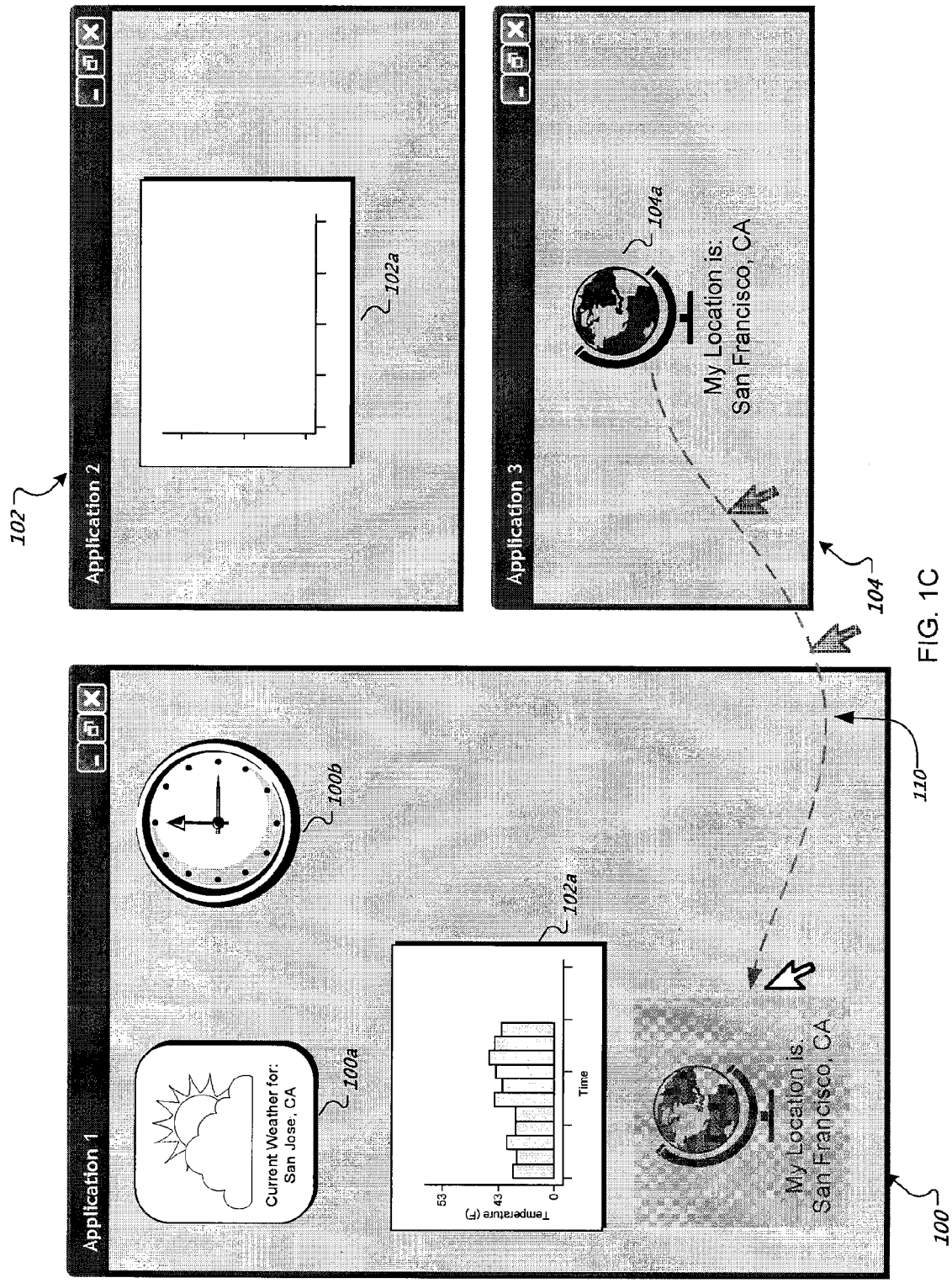

FIGS. 1B-C illustrate how a component can be interactively dragged from a donor application and dropped into a recipient application to move the component, or a copy of the component, to the recipient application. This is a so-called drag-and-drop operation commonly found in many GUIs. Other techniques for interactively performing the same functionality are possible. In this illustration, graph component 102a is dragged from window 102 to window 100, thus causing the component 102a to be integrated into the application associated with window 100. A user or a process can select (e.g., with a mouse or other input device) the graph component 102a. Then, a visual representation of the component 102a is "dragged" 106 over window 100 and "dropped" at a target location (e.g., 108) at which point the graph component 102a will be integrated into the application associated with window 100, as shown in FIG. 1C.

The illustration of component integration described above will now be discussed in more detail. Initially, the component to be moved or copied is identified by a user or a process. For example, the donor application associated with window 102 detects that a mouse drag event has occurred on a window region associated with component 102a. In response to this event, the donor application associated with window 102, or another process, collects component information that might be needed by the recipient application (e.g., the application associated with window 100). The component information includes, or refers to, information describing the component's automatic connections as well as the location of the component's source code and/or executable code. Automatic connections are further described below. Other information can be included with the component information including, but not limited to, the location of component resources such as image files, icons, sound files, other content, digital rights management (DRM) information for the component, and information regarding the donor application. DRM information can specify the privileges or rights granted from the donor application to the recipient application for use of the component. These rights can include, for example, the right to execute the component (e.g., in a non-demonstration mode or a limited demonstration mode), rights governing use of the component's connections, the right to persist the component in the recipient application, and other rights.

The recipient application associated with window 100 then detects that a mouse drop event has occurred at a target location 108 on the window 100 (or a collapsed, shrunken or minimized version of window 100, or an alternative representation of the recipient application such as an icon or other visual object). In response, the recipient application or another process incorporates the code for the component into the recipient application. If the recipient application includes a virtual machine (VM), such as the Adobe Flash ActionScript virtual machine available from Adobe Systems Incorporated of San Jose, Calif., code designated to handle the mouse drop event in the VM can cause the source or executable code identified by the drop-target information to be loaded into the VM such that the component and its types (e.g., classes, interfaces) become part of the recipient application's runtime environment. If the recipient application does not include a VM, then the recipient application's mouse drop event handler can dynamically load the component's code by way of a dynamic link library (DLL) or similar mechanism, for example. Other techniques for integrating code into a running application are possible.

In various implementations, if the component has a visual representation, such as the graph component 102a, the recipient application integrates the component's visual representation into the recipient application's display hierarchy such that the component is visually apparent to the user (e.g., in window 100). In various implementations, if the recipient application supports a document object model (DOM), for instance, the component can be incorporated into the DOM hierarchy so that the component's visual representation will appear in the recipient application's window when the DOM is presented in the window. In some implementations, the component's visual representation is incorporated into the recipient application's display hierarchy such that the component appears at or near the target location (e.g., 108).

Figure 1D:
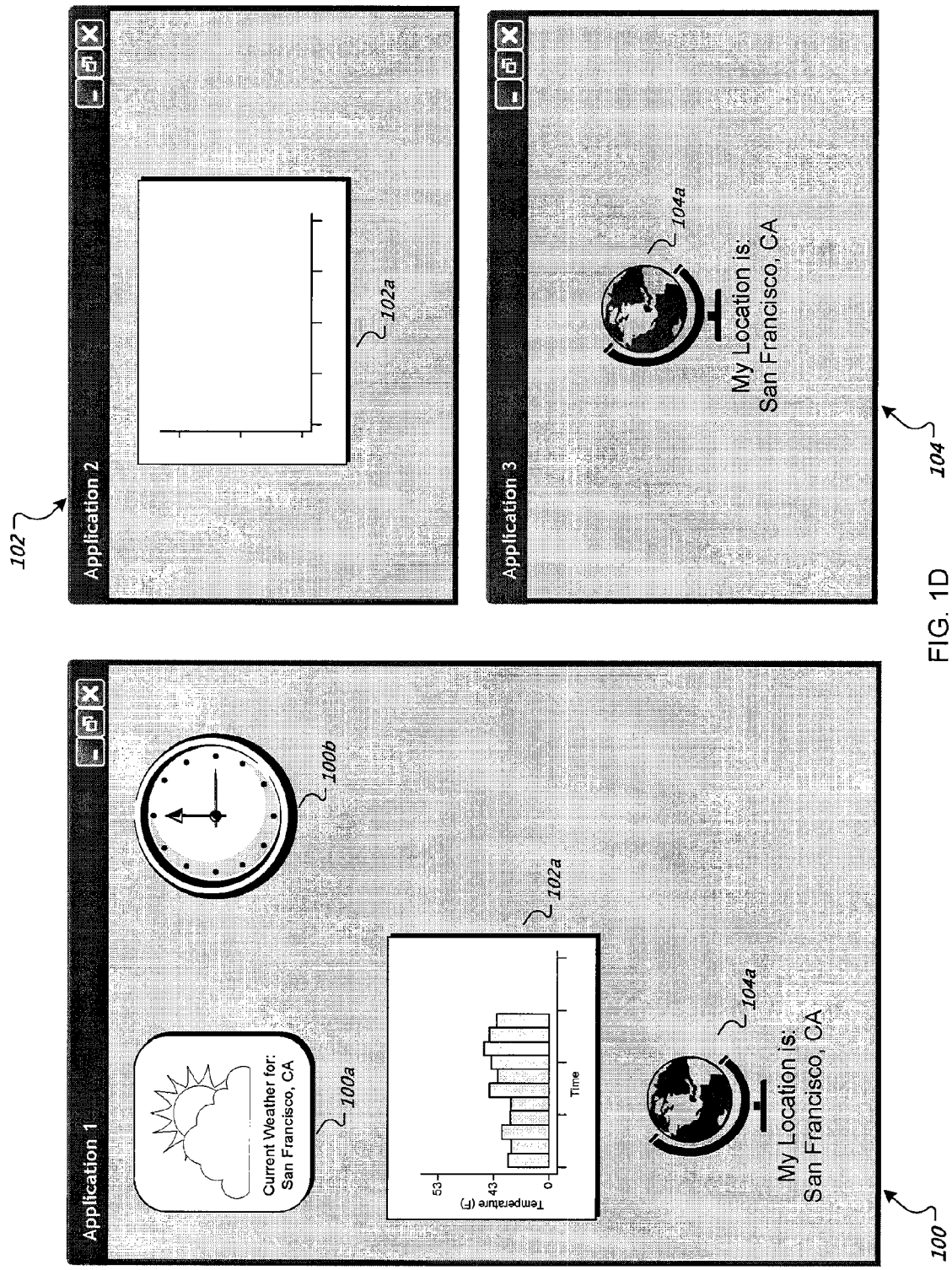

The recipient application or another process further integrates the dropped component by attempting to connect the component's automatic connections with connections of other components in the recipient application. As illustrated in FIG. 1C, the graph component 102a in window 100 has been automatically connected to the weather component 100a and the clock component 100b in the application associated with window 100 in order to graph temperature (from component 100a) vs. time (from component 100b). Automatic connections allow users to easily integrate components into applications without the need for having programming language skills. As a further illustration, the location component 104a is dragged 110 from window 104 to window 100 and integrated into the application associated with window 100. As shown in FIG. 1D, the location component 104a has been automatically connected to the weather component 100a such that the weather component 100a is now providing a forecast for San Francisco, Calif. rather than San Jose, Calif. The changed weather information (e.g., temperatures) will be provided to the graph component 102a so that the graph now reflects San Francisco temperatures over time.

Figure 2B:
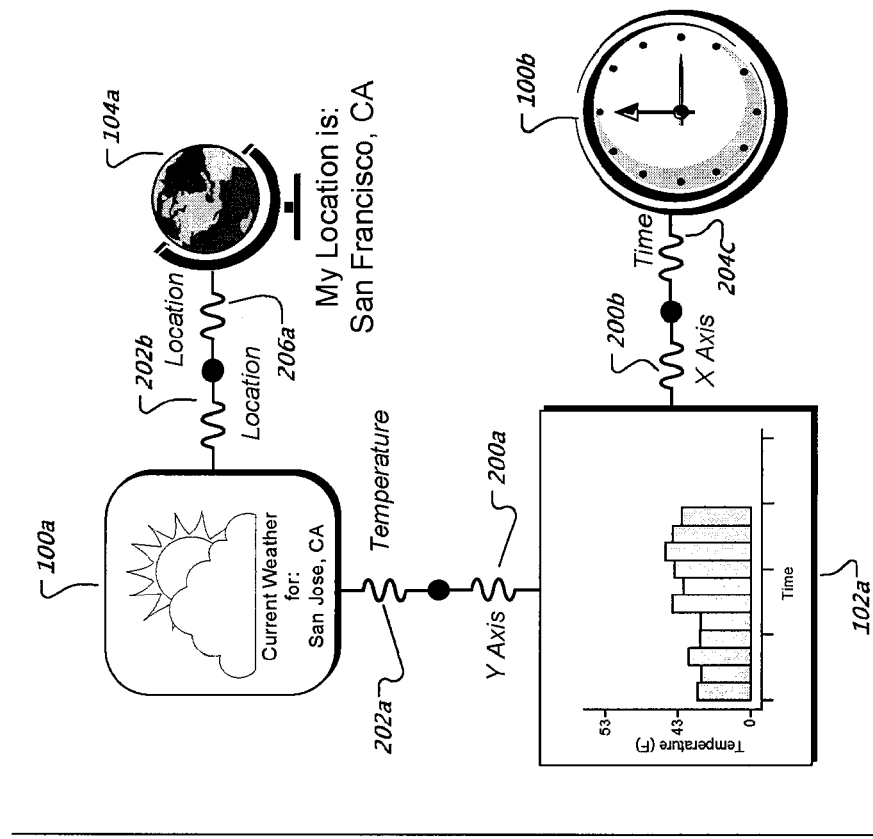
FIG. 2B is a schematic diagram of the components in a connected state.
Figure 2A:
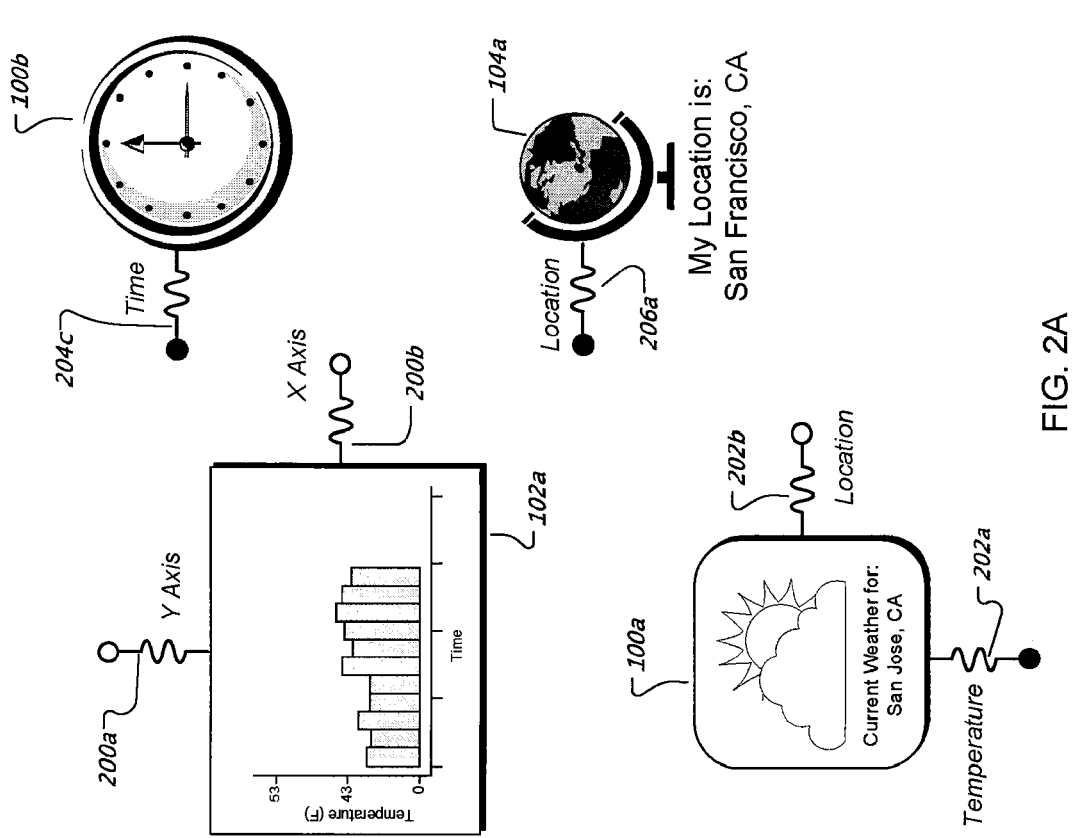
FIG. 2A is a schematic diagram of the components in an unconnected state.

FIG. 2A is a schematic diagram of the components of FIGS. 1A-D in an unconnected state. A component's properties can serve as sites for automatic connection with the properties of other components. Such properties, hereinafter referred to as "connections," act as sources or sinks. A source connection is a connection that provides information to one or more sink connections of other components. A sink connection is a connection that receives information from one or more source connections of other components. A component can have one or more source connections, sink connections, or combinations of these. As an example, if a component is realized as a class in an object oriented programming language (e.g., ActionScript, Java or C++), methods of the class could be designated automatically or manually as source connections if they are configured to produce or return information, and as sink connections if they are configured to receive information in one or more parameters. (Component connections are described in more detail in reference to FIG. 3 below.)

By way of illustration, the weather component 100a has a source connection 202a for providing temperature information, the clock component 100b has a source connection 204c for providing time information, the graph component 102a has a sink connection 200a for receiving Y values and a second sink connection 200b for receiving X values. And the location component 104a has a source connection 206a for providing location information. In various implementations, connections exchange information as text strings (e.g., Unicode characters), binary data, <name, value> tuples, markup language (e.g., eXtensible Markup Language), or combinations of these. Other information formats are possible. In further implementations, the data binding features of the Adobe Flex cross platform application framework can be used to exchange information between connections.

FIG. 2B is schematic diagram of the components of FIGS. 1A-D automatically connected as shown in the application associated with window 100. The location component 104a provides location information through source connection 206a to the weather component 100a by way of sink connection 202b. The weather component 100a in turn displays the weather for the received location and provides temperature information for the location on the source connection 202a. The temperature information is received by the graph component 102a's Y axis sink connection 200a. The current time information provided by the clock component 100b over source connection 204c is received by the X axis sink connection 200b and used to plot temperature as a function of time in the graph component 102a.

A component can comprise one or more of programming language source code, compiled or translated programming language source code, metadata, properties, and resources (e.g., images, sounds, or other content). By way of illustration, a component can be a method, a function, a procedure, a script, an event handler, a signal handler, or various combinations of these. Other component types are possible.

A component can participate in an automatic connection process (e.g., such as when a component is dropped into a recipient application) if one or more of its connections are designated as auto-connectable. In various implementations, metadata tags or other designators inline with a component's source code, or external from the source code, can indicate which connections are auto-connectable. For example, a metadata tag [AutoConnect] can be used to designate such connections. Example tag values are as follows:

```
[AutoConnect(source, option₁, ... optionₙ)]
[AutoConnect(sink, option₁, ... optionₙ)]
[AutoConnect(source, sink, option₁, ... optionₙ)]
```

The "source" parameter indicates that a designated connection (e.g., method) can supply information to other components. The "sink" parameter indicates that the connection can accept information from other components. In some implementations, a connection can be both a source and a sink.

In further implementations, the order in which connections are made and other options can influence the automatic connection process. For example, the [AutoConnect] tag allows for one or more optional parameters indicated as option₁, . . . optionₙ. An "order=n" optional parameter specifies the order "n" in which this automatically connectable connection should be considered. For example, consider the following ActionScript code:

```
[AutoConnect(source, order=1)]
public function get windSpeed ( ) : Number { return 3; }
```

Indicates that the connection called "windSpeed" should be considered before other connections for this component when connecting to other components.

Another optional parameter is "NamesMustMatch"—this restricts the type of connection between component properties to ones where the property names on the two candidates match exactly:

```
[AutoConnect(source, NamesMustMatch)]
public function get windSpeed ( ) : Number { return 3; }
```

That is, for example, if one component specifies on a property named "windSpeed" that "NamesMustMatch," that property will only be bound to a property named "windSpeed" on another component.

Alternatively, two connection names match if they are synonyms. In a further alternative, the names match if they are within a specified edit distance of each other (e.g., the edit distance between two strings of characters is the number of operations required to transform one of them into the other). Other ways of matching are possible.

Another optional parameter is "TypesMustMatch"—this restricts the type of connection between component properties to ones where the property types on the two candidates match exactly or, alternatively, or are compatible (e.g., one type can be converted into the other):

```
[AutoConnect(source, TypesMustMatch)]
public function get Temperature ( ) : Number {return 78;}
```

That is, if one component specifies on a property named "Temperature" that "TypesMustMatch," that property will only be bound to a sink connection on another component that accepts an numeric value (e.g., 78) rather than a string, for example.

A further optional parameter is "DRMMustMatch"—this restricts the type of connection between component properties to ones where the DRM rights on the two candidates match exactly or, alternatively, or are compatible.

Yet a further optional parameter is "AllowMultiple" which means that the source or sink connection so tagged is not removed from the pool of available connections once a connection has been made.

Figure 3:
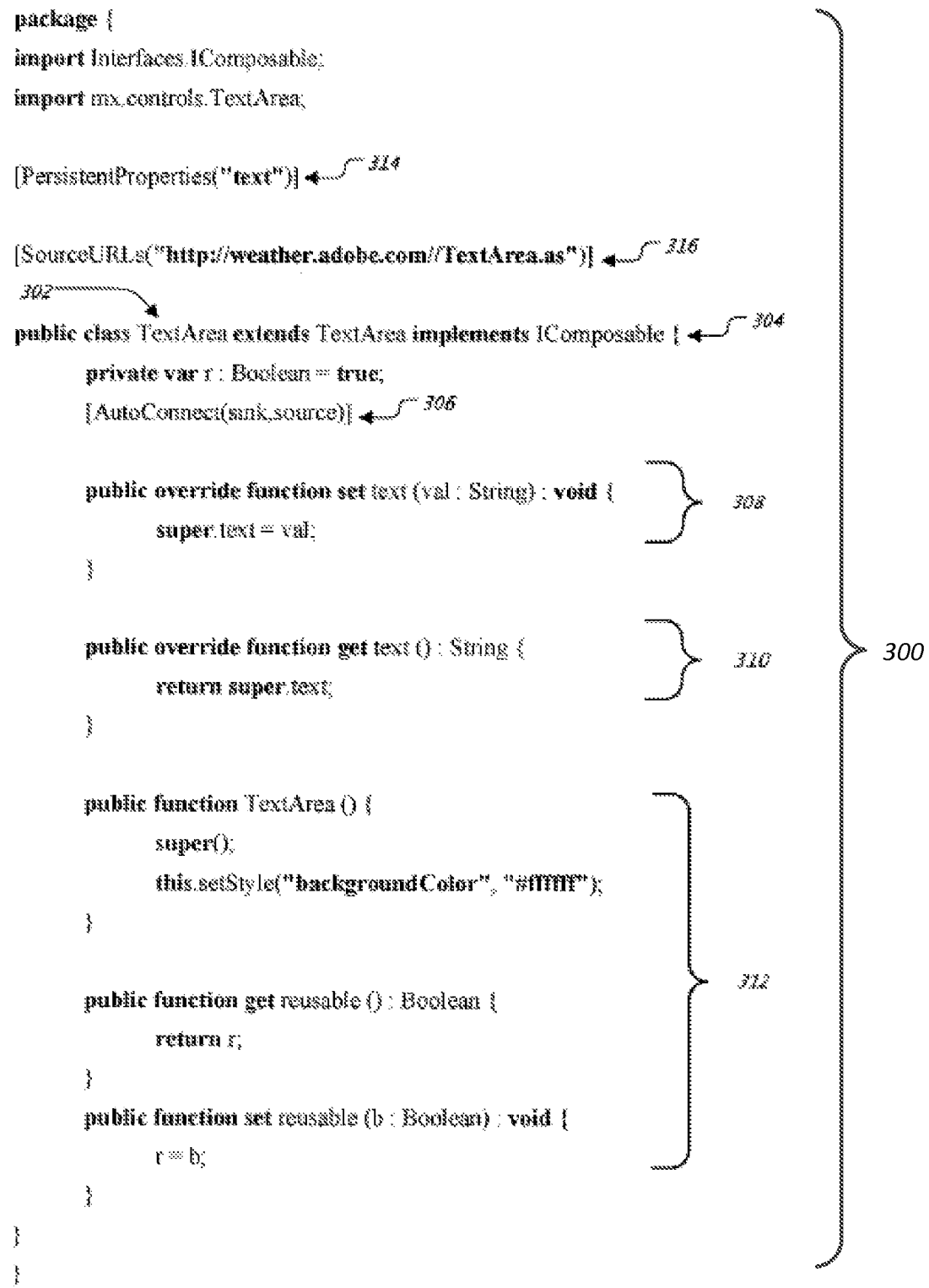
FIG. 3 illustrates source code for an example component using inline metadata tags.

FIG. 3 illustrates ActionScript source code 300 for an example component using inline metadata tags. The location of the component's source code is given by the metadata tag 316 which specifies the location as a Universal Resource Locator (URL). The "PersistentProperties" tag 314 indicates which properties in a component should be serialized on a drag-and-drop or equivalent operation so the state of the component is preserved and restored in the recipient application (and also when the "current configuration" of a running app is saved). Individual components properties can be tagged with PersistentProperties to achieve the same result.

The component is defined as a class 302 named "TextArea" that implements an interface "IComposable" 304. The IComposable interface designates a class as a reusable component to the compiler or runtime environment, for example. The component includes two methods which have been designated as being auto-connectable by the metadata tag 306. These are the set text method 308, which acts as a sink connection, and the get text method 310, which acts as a source connection. The other methods 312 are not designated as auto-connectable and so are not be considered during an automatic connection process.

Figure 4A:
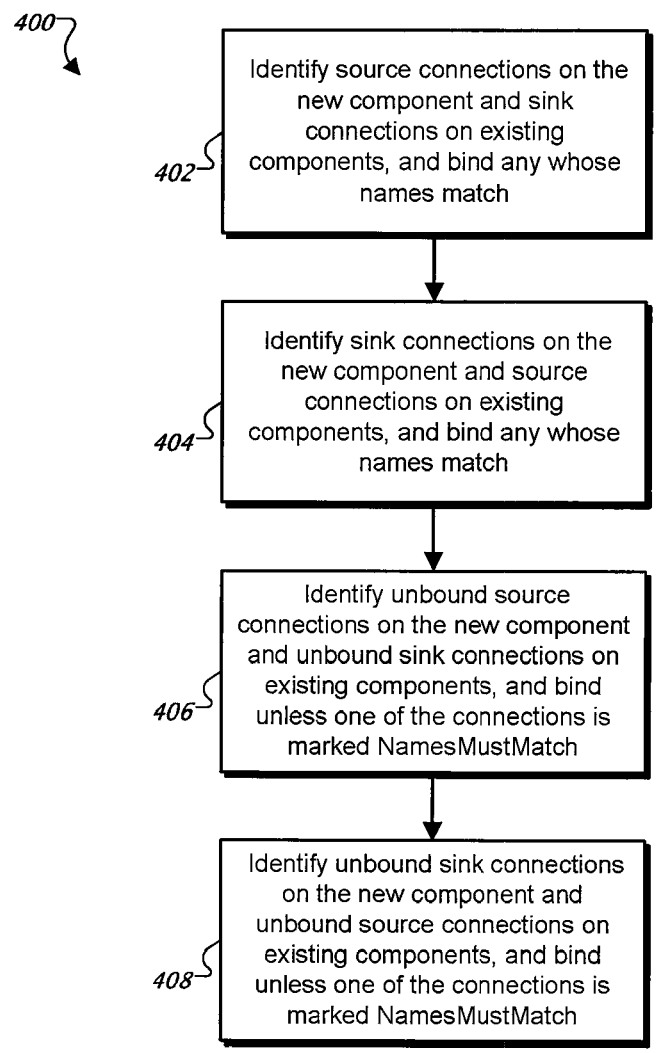
FIG. 4A is a flow diagram of an example automatic connection technique.

FIG. 4A is a flow diagram 400 of an example automatic connection technique. In various implementations, when a new component is integrated into a recipient application, several attempts to make connections with existing components in the recipient application are made. Initially, source connections on the new component and sink connections on existing components are identified. When a source connection's name on the new component matches a sink connection's name on an existing component, they are bound together (step 402). Likewise, when a sink connection's name on the new component matches a source connection's name on an existing component, they are bound together (step 404). Unbound source connections on the new component are identified and bound to unbound sink connections on existing components unless one of the connections is designated as NamesMustMatch (step 406). Unbound source connections on the new component are identified and bound to unbound sink connections on existing components unless one of the connections is designated as NamesMustMatch (step 408). This technique can be modified to match based on types or other criteria. Bound connections, once made, can be persisted when the recipient application state is saved such that they are reconstructed as they were previously when the recipient application is restarted.

Figure 4B:
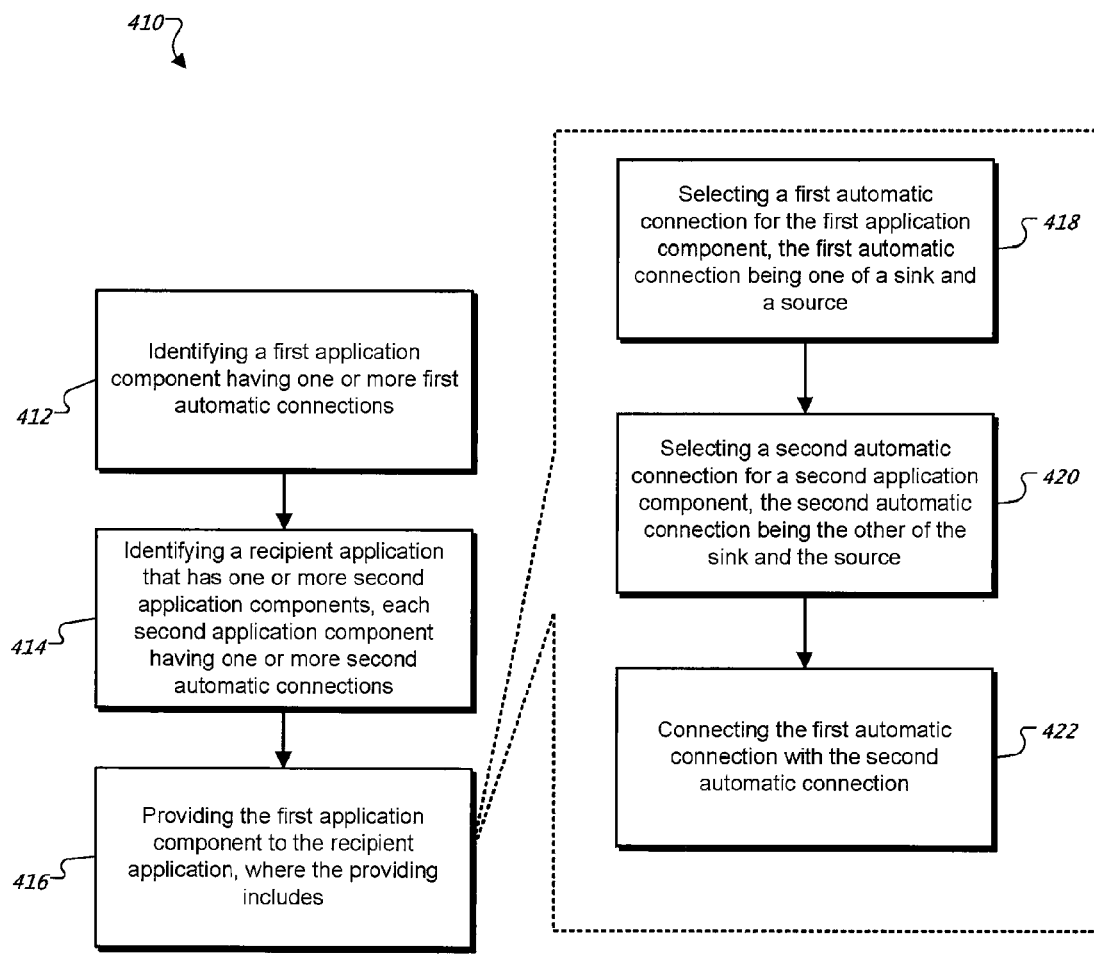
FIG. 4B is a flow diagram of an example technique for integrating an application component into an application.

FIG. 4B is a flow diagram 410 of an example technique for integrating an application component into an application. A first application component is identified (e.g., in a donor application), the first application component having one or more first automatic connections (step 412). A running recipient application is then identified where the recipient application has one or more one or more second application components, each second application component having one or more second automatic connections (step 414). The first application component is provided to the recipient application (step 416), where the providing includes: selecting a first automatic connection for the first application component, the first automatic connection being one of a sink and a source (step 418); selecting a second automatic connection for a second application component, the second automatic connection being the other of the sink and the source (step 420); and connecting the first automatic connection with the second automatic connection so that information can be exchanged between the first application component and the second application component by way of the first automatic connection and the second automatic connection while the second application is running (step 422).

Figure 5:
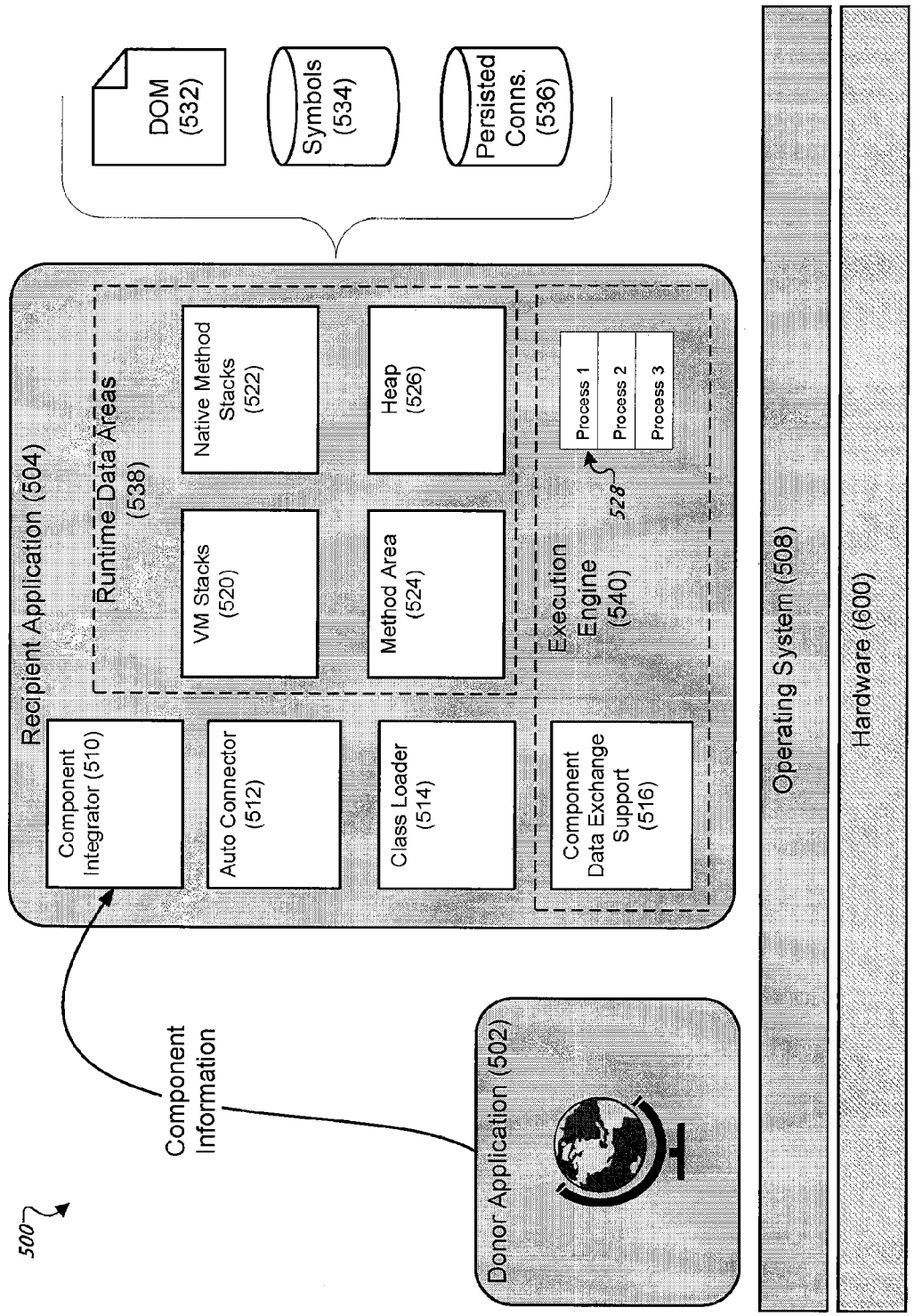
FIG. 5 is a schematic diagram of an example automatic component connection system.

FIG. 5 is a schematic diagram of an example automatic component connection system 500. In this example, a donor application 502 and a recipient application 504 are shown executing on the same computing device (600). However, this need not be the case. In general, the donor application 502 and the recipient application 504 can execute on different computing devices connected by a computer network, for example. The donor application 502 or another process provides component information to the recipient application 504 which is received by the component integrator module 510. In some implementations, the recipient application 504 is a web browser. In some implementations, the recipient application 504 is an Adobe AIR application. Adobe AIR is a cross-operating system runtime that allows web developers to leverage their existing skills (such as HTML and JavaScript) to build and deploy web applications on the desktop. Adobe AIR is available from Adobe Systems Incorporated of San Jose, Calif. Other recipient applications are possible, including applications that do not include a VM.

The integrator module 510 invokes the class loader 514 to load the component's code from the location designated in the component information and populates a symbols database 534 with the symbols and associated types found in the code. The class loader 514 also recognizes metadata tags in the code and creates entries in the symbols database 534 for each connection including the connection type (e.g., sink, source), and any options placed on the connection. Code associated with the symbols is stored in the method area 524 of the runtime data area 538. The runtime data area 538 also includes stacks 520 for use by the VM and native method stacks 522 for use when invoking native methods. A heap 526 is available to methods for creating global objects. The integrator module 510 can also integrate DRM information, if any, for the component or its connections (from the component information) into the symbols database 534.

Once the code and DRM information have been processed, the auto connector module 512 attempts to bind automatic connections on the component with components in the recipient application 504. For example, see FIG. 4A and the accompanying discussion. The integrator 510 then installs component's visual representation, if any, in the DOM 532 such that the visual representation will be presented in a rendering of the DOM. In some implementations, the location of the visual representation is based on the target location (e.g., 108), if this information is included in the component information. In other implementations, the component integrator 510 can arrange the component visual representations based on their connectivity such that connected components appear closer to each other, for example. Other visual arrangements are possible.

The execution engine 540 executes code (e.g., ActionScript) from the method area 524 to create running processes 528 that can make use of the VM's resources such as the VM stacks (510) and heap (526). The executing processes 528 can utilize one or more components. Components are able to exchange information between their bound connections in a number of ways. In some implementations, the components use a synchronous messaging model implemented by the component data exchange support module 516. In this model, sink connections are registered with an event dispatcher implemented by the data exchange support module 516. When a source connection has new information to provide, the event dispatcher invokes each sink connection registered with the source connection to receive the information.

Another component interaction model is an asynchronous event model. In this model, the component data exchange support module 516 implements an event queue which source connections can post to when new data is available and sink connections can read from, asynchronously, when they are ready to receive new data. In some implementations, there is one event queue for each bound source connection. This allows for event compression since a sink connection might only desire the latest value from a source, rather than all values that have been posted since the last time the sink connection read from the queue.

A further component interaction model is a shared memory model which uses the heap 526 to store a global source connections table. Similar to the asynchronous event model, source connections can set a flag in the shared memory table when source data is ready. The component data exchange support module 516 periodically scans the table to see if new data is available on any of the connections. If so, the module 516 notifies sink connections that are bound to the source connection so that they may obtain the data.

Yet a further component interaction model is based on a data flow model. A directed graph is constructed by the component data exchange support module 516 which reflects the dependencies between sink connections and source connections. Downstream sink connections attempt to read upstream source connections and will block until the upstream source connections generate new data. Other implementations are also possible.

Figure 6:
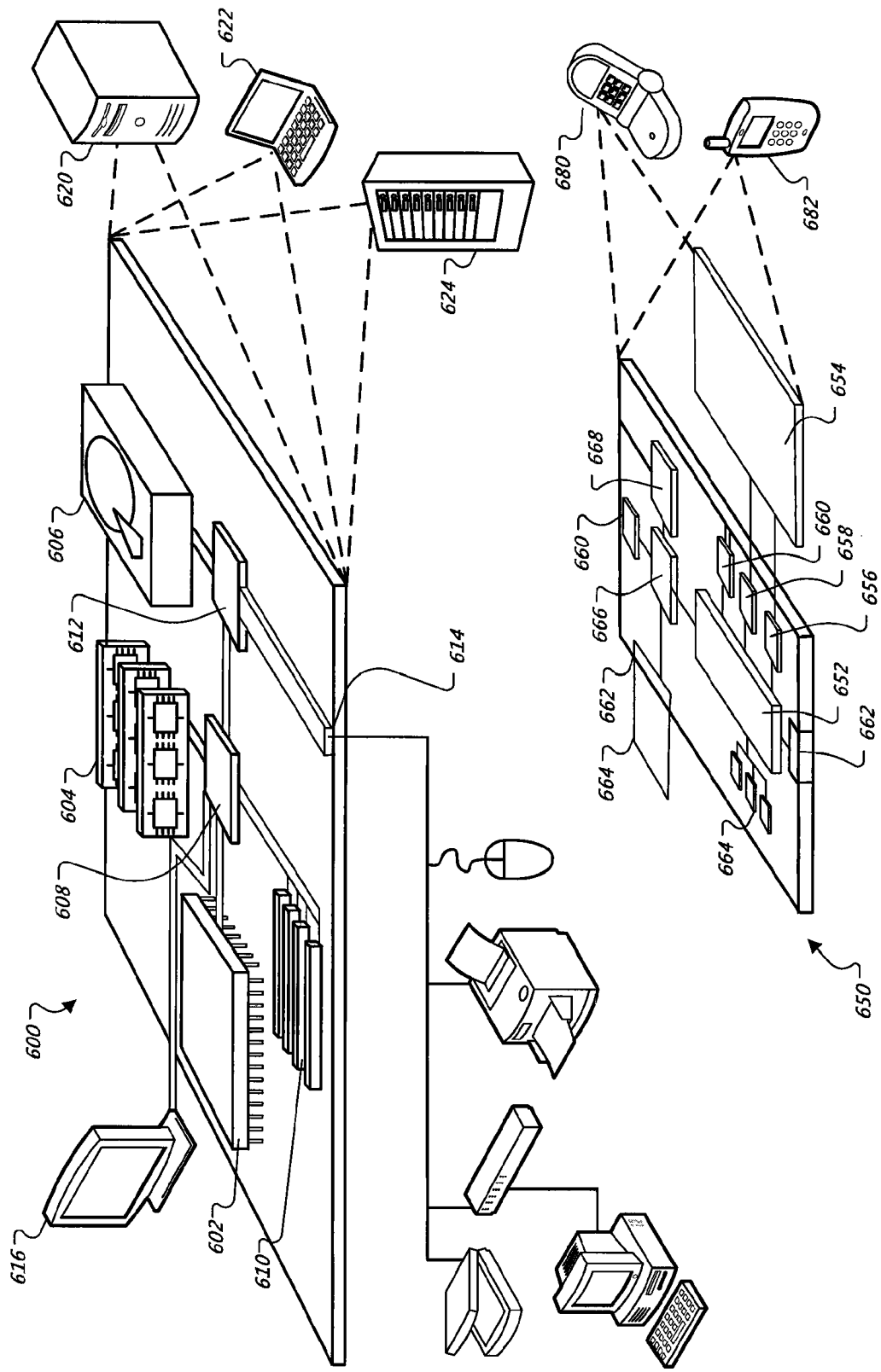
FIG. 6 is a block diagram of example computing devices.

FIG. 6 is a block diagram of computing devices 600, 650 that may be used to implement the systems and techniques described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 812 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method, comprising:
receiving information by a running application identifying a first application component, the first application component having a set of code including a first set of one or more class members that can be connected to a second set of one or more class members of a second application component;
identifying a first class member of the first application component based, at least in part, on a first metadata tag related to the first class member, the first class member being one of a sink and a source, wherein the first metadata tag includes a connection-order designation, which indicates an order in which the first class member should be ranked as compared to other class members of the first application component when determining whether first-class-member code of the first class member should be integrated with another class member;
automatically selecting a second class member for the second application component, the second application component residing in the running application, the second class member being the other of the sink and the source; and
connecting the first class member with the second class member by integrating code, which is executable to carry out the first class member, into a runtime environment of the running application, so that information can be exchanged between the first application component and the second application component.

2. The method of claim 1 where the running application is a first running application and the first application component is obtained from a second running application.

3. The method of claim 2 where the first application component has a visual representation in the second running application.

4. The method of claim 3 comprising:
presenting the first application component's visual representation in the first running application.

5. The method of claim 2 where the first application component is obtained by the first running application from the second running application by a drag-and-drop operation of the first application component from the second running application to the first running application.

6. The method of claim 1 where the first application component is obtained from a file system.

7. The method of claim 1, wherein automatically connecting the first connection with the second connection creates a connection between the first application component and the second application component, and further comprising: persisting the connection between the first application component and the second application component.

8. The method of claim 1 where the information exchanged between the first application component and the second application component is textual.

9. The method of claim 1, wherein the first metadata tag includes a first parameter associated with the first connection and the second connection is related to a second metadata tag including a second parameter, and wherein the first parameter matches the second parameter in at least one of the following: the first parameter is synonymous with the second parameter or the first parameter is compatible with the second parameter.

10. The method of claim 1, wherein the first metadata tag include at least one of a first source parameter and a first sink parameter corresponding to the first connection being the one of the sink and the source and wherein a second metadata tag includes at least one of a second source parameter and a second sink parameter corresponding to the second connection being the one of the sink and the source.

11. A computer program product, encoded on a non-transitory computer-readable medium, operable to cause one or more processors to perform operations comprising:
receiving information by a running application identifying a first application component, the first application component having a set of code including a first set of one or more class members that can be automatically bound to a second set of one or more class members of a second application component;
automatically identifying a first class member for the first application component based, at least in part, on a first metadata tag related to the first class member, the first class member being one of a sink and a source, wherein the first metadata tag includes a binding-order designation, which indicates an order in which the first class member should be ranked as compared to other class members of the first application component when determining whether the first class member should be programmatically bound to another class member;
automatically selecting a second class member for the second application component, the second application component residing in the running application, the second class member being the other of the sink and the source; and
automatically programming a persistent bound connection between the first class member and the second class member so that information can be exchanged between the first application component and the second application component by using an application framework.

12. The program product of claim 11 where the running application is a first running application and the first application component is obtained from a second running application.

13. The program product of claim 12 where the first application component has a visual representation in the second running application.

14. The program product of claim 13 where the operations comprise: presenting the first application component's visual representation in the first running application.

15. The program product of claim 12 where the first application component is obtained by the first running application from the second running application by a drag-and-drop operation of the first application component from the second running application to the first running application.

16. The program product of claim 11 where the first application component is obtained from a file system.

17. The program product of claim 11, where the operations comprise: integrating code for running the first application component into the running application.

18. The program product of claim 11 where the information exchanged between the first application component and the second application component is textual.

19. The computer program product of claim 11, wherein the first metadata tag includes a first parameter associated with the first connection and the second connection is related to a second metadata tag including a second parameter, the first parameter matches the second parameter in at least one of the following: the first parameter is synonymous with the second parameter or the first parameter is compatible with the second parameter.

20. The computer program product of claim 11, wherein the first metadata tag include at least one of a first source parameter and a first sink parameter corresponding to the first connection being the one of the sink and the source and wherein a second metadata tag includes at least one of a second source parameter and a second sink parameter corresponding to the second connection being the one of the sink and the source.

21. A system comprising:
a machine-readable storage device including a program product; and
one or more processors operable to execute the program product, interact with a display device, and perform operations comprising:
receiving information by a running application identifying a first application component, the first application component having a set of code including a first set of one or more class members that can be programmatically bound to a second set of one or more class members of a second application component;
automatically identifying a first class member for the first application component based, at least in part, on a first metadata tag related to the first class member, the first class member being one of a sink and a source, wherein the first metadata tag includes a binding-order designation, which indicates an order in which the first class member should be ranked as compared to other class members of the first application component when determining whether the first class member should be programmatically bound to another class member;
automatically selecting a second class member for the second application component, the second application component residing in the running application, the second class member being the other of the sink and the source; and
automatically programming a persistent bound connection between the first class member and the second class member so that information can be exchanged between the first application component and the second application component.

22. The system of claim 21 where the running application is a first running application and the first application component is obtained from a second running application.

23. The system of claim 22 where the first application component has a visual representation in the second running application.

24. The system of claim 23 comprising:
presenting the first application component's visual representation in the first running application.

25. The system of claim 22 where the first application component is obtained by the first running application from the second running application by a drag-and-drop operation of the first application component from the second running application to the first running application.

26. The system of claim 21 where the first application component is obtained from a file system.

27. The system of claim 21 where programming the persistent bound connection includes integrating code for running the first application component into the running application.

28. The system of claim 21 where the information exchanged between the first application component and the second application component is textual.

29. The system of claim 21, wherein the first metadata tag includes a first parameter associated with the first connection and the second connection is related to a second metadata tag including a second parameter, and wherein the first parameter matches the second parameter in at least one of the following: the first parameter is synonymous with the second parameter or the first parameter is compatible with the second parameter.

30. The system of claim 21, wherein the first metadata tag include at least one of a first source parameter and a first sink parameter corresponding to the first connection being the one of the sink and the source and wherein a second metadata tag includes at least one of a second source parameter and a second sink parameter corresponding to the second connection being the one of the sink and the source.

* * * * *